(12) United States Patent
Lee

(10) Patent No.: US 7,801,577 B2
(45) Date of Patent: Sep. 21, 2010

(54) BATTERY COVER GROUNDING DEVICE FOR PORTABLE TERMINAL

(75) Inventor: You-Jin Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 634 days.

(21) Appl. No.: 11/746,534

(22) Filed: May 9, 2007

(65) Prior Publication Data

US 2008/0102351 A1     May 1, 2008

(30) Foreign Application Priority Data

Oct. 30, 2006     (KR) .................. 10-2006-0105690

(51) Int. Cl.
*H04M 1/00* (2006.01)

(52) U.S. Cl. .............. 455/575.1; 455/90.3; 455/128; 174/257; 379/330

(58) Field of Classification Search ............. 455/575.1, 455/90.3, 128, 562.1, 575.7; 361/767; 174/257; 379/330
See application file for complete search history.

(56) References Cited

U.S. PATENT DOCUMENTS

| | | | | |
|---|---|---|---|---|
| 4,376,996 A * | 3/1983 | Wuthrich | .................. | 368/220 |
| 5,590,028 A * | 12/1996 | Duncan | ..................... | 361/737 |
| 6,028,555 A * | 2/2000 | Harano | ........................ | 343/702 |
| 6,071,642 A * | 6/2000 | Pospiech et al. | ............ | 429/175 |
| 6,724,618 B1 * | 4/2004 | Jenkins et al. | ......... | 361/679.32 |
| 6,730,432 B1 * | 5/2004 | Grosfeld et al. | ............... | 429/97 |
| 6,940,460 B2 * | 9/2005 | Maoz et al. | ................. | 343/702 |
| 6,944,015 B1 * | 9/2005 | Jenkins et al. | ......... | 361/679.03 |
| 7,025,500 B2 * | 4/2006 | Tabata | ........................ | 374/121 |
| 7,187,959 B2 * | 3/2007 | Ponce De Leon et al. | | 455/575.7 |
| 7,633,449 B2 * | 12/2009 | Oh et al. | ..................... | 343/702 |
| 2003/0029976 A1 * | 2/2003 | Saitoh et al. | ........... | 248/226.11 |
| 2003/0224837 A1 * | 12/2003 | Kuriyama et al. | ........ | 455/575.1 |
| 2005/0113037 A1 * | 5/2005 | Ponce De Leon et al. | .. | 455/90.3 |
| 2005/0186815 A1 * | 8/2005 | Asrani et al. | ................ | 439/108 |
| 2005/0243486 A1 * | 11/2005 | Wingfield et al. | ............. | 361/56 |
| 2006/0086518 A1 * | 4/2006 | Kawaguchi et al. | ....... | 174/35 R |
| 2006/0159294 A1 * | 7/2006 | Akino | ........................ | 381/174 |
| 2008/0020813 A1 * | 1/2008 | Choi et al. | ................. | 455/575.3 |
| 2008/0161069 A1 * | 7/2008 | Hankui | ........................ | 455/572 |
| 2008/0194219 A1 * | 8/2008 | Castaneda et al. | ........ | 455/193.1 |
| 2008/0231462 A1 * | 9/2008 | Hobart | .................... | 340/686.6 |
| 2009/0219214 A1 * | 9/2009 | Oh et al. | ..................... | 343/702 |
| 2009/0315789 A1 * | 12/2009 | Sung et al. | ................... | 343/702 |
| 2010/0015520 A1 * | 1/2010 | Chen | .......................... | 429/163 |
| 2010/0016024 A1 * | 1/2010 | Yang et al. | .................. | 455/566 |

FOREIGN PATENT DOCUMENTS

KR     10-2005-00070324 A     7/2005

* cited by examiner

*Primary Examiner*—Minh D Dao
(74) *Attorney, Agent, or Firm*—Jefferson IP Law, LLP

(57) ABSTRACT

A battery cover grounding device for a portable terminal including a metallic battery cover is provided. The grounding device includes a grounding member installed on the terminal to be connected to a grounding surface of the terminal and to be in contact with the battery cover. The grounding member has a cover protrusion formed on the battery cover and a grounding protrusion attached to the terminal to contact the cover protrusion. In this manner, the metallic battery cover is connected to the grounding surface of the terminal to minimize the possibility of current leakage, to improve the stability of the operation of the terminal, and to minimize potential malfunctions of the terminal due to static electricity.

20 Claims, 5 Drawing Sheets

BATTERY COVER GROUNDING DEVICE FOR PORTABLE TERMINAL

PRIORITY

This application claims the benefit under 35 U.S.C. §119(a) of a Korean patent application filed in the Korean Industrial Property Office on Oct. 30, 2006 and assigned Serial No. 2006-105690, the entire disclosure of which is hereby incorporated by reference.

BACKGROUND OF THE INVENTION

1. Field of the Invention

The present invention relates to a portable terminal. More particularly, the present invention relates to a grounding device for a battery cover of a portable terminal.

2. Description of the Related Art

Generally, portable terminals are devices that provide users with mobile communication functions. In addition to being used for mobile communication functions, portable terminals are used as multi-functional devices, such as multimedia devices that reproduce music files, moving picture files and others, and financial service devices for micro payment, mobile banking, and the like.

Portable terminals may be classified as bar-type, flip-type, and folder-type terminals according to their external shapes. Recently, slide-type terminals have emerged on the market and have garnered a large share of the market together with folder-type terminals.

A bar-type terminal is a device in which an input unit (such as a keypad and a transmitter) and an output unit (such as a display and a receiver) are provided in a single housing. One advantage of bar-type terminals is that they have a simple construction with the installation of all components for mobile communication functions in a single housing. There is a limit to the miniaturization of bar-type terminals, however, because there must be a certain interval between the transmitter and the receiver for voice communication.

A flip-type terminal is a device in which a flip cover is rotatably installed to a bar-type terminal. The flip cover prevents malfunctions by limiting access to the input unit (such as the keypad) when the terminal is in a call standby mode. Similar to bar-type terminals, there is a limit to the miniaturization of flip-type terminals due to the problem of securing a certain interval between the transmitter and the receiver.

A folder-type terminal is a device in which a pair of housings are hingedly coupled to each other. For a long period, folder-type terminals have garnered most of the market for portable terminals because they may be miniaturized more easily because the input unit and output unit may be disposed on respective housings of the pair of housings to secure a sufficient interval between the transmitter and the receiver.

A slide-type terminal has a pair of housings that are slidably coupled to each other such that the input unit and the output unit are separately disposed on respective housings of the pair of housings. In a slide-type terminal, in particular, the keypad in the input unit is opened or closed by relative sliding movement of the housings. This way, in a call standby mode, malfunctions are prevented, and in a calling mode, it is easy to secure an appropriate interval between the transmitter and the receiver. Thus, this makes it easier to miniaturize the slide-type terminal. This has allowed slide-type terminals to gather a large market share.

These portable terminals include separate battery packs as power supplies. A typical installation space for a battery pack is configured such that the battery pack is installed by placing one end of the battery pack into the installation space, pivoting the battery pack into the installation space, and locking the battery pack into the installation space with a lock disposed on the other end of the battery pack. Another type of installation space is configured such that the battery pack is slidingly moved while being brought into contact with the terminal, is engaged with the terminal, and is then fixed thereto using a hook.

Although efforts are being made to miniaturize portable terminals so that they are more portable, at the same time, portable terminals should have a display with a sufficient size to provide multimedia functions, such as watching broadcasting and reproducing moving pictures. Thus, in the case of a terminal with multimedia functions, the thickness of the terminal is reduced to make it light and compact while also providing a large size for the display.

With a conventional installation structure for a battery pack (in which a battery fixing hole is provided at the terminal so as to detachably fix the battery pack), it is difficult to secure in a slim terminal sufficient space to form a protrusion, a hook, and the like to couple and fix the battery pack into the portable terminal. To address this, an installation space that receives a battery pack and protects it using a separate cover has been proposed. The battery cover for protecting the battery pack in the slim terminal is shaped like a flat plate and is made of a metallic material to provide impact resistance and secure engagement with the terminal. Such a metallic cover is conductive and may cause current to leak, causing inconvenience to a user. Further, the conductivity of the metallic material may affect the operation of the circuit devices therein or the radiation characteristics of an antenna in the portable terminal so that it is difficult to achieve stable operation of the terminal.

SUMMARY OF THE INVENTION

Accordingly, the present invention has been made to address the above-mentioned problems and/or disadvantages, and an aspect of the present invention is to provide a grounding device for a battery cover for a slim terminal that contributes to the protection of a battery pack and the stable operation of the terminal.

Another aspect of the invention is to provide a grounding device for a metallic battery cover for a slim terminal that prevents the metallic battery cover from interfering with the operation of the circuit devices (including an antenna unit), thereby improving performance of the portable terminal.

In accordance with an aspect of the present invention, a battery cover grounding device for a portable terminal is provided. The battery cover grounding device includes a metallic battery cover and a grounding member disposed on the terminal to be connected to a grounding surface of the terminal and to be in contact with the battery cover. The grounding member includes a cover protrusion on the battery cover and a grounding protrusion on the terminal to contact the cover protrusion.

In accordance with another aspect of the present invention, a portable terminal includes a housing having a battery opening, a metallic battery cover for closing the battery opening, and a grounding member for grounding the metallic battery cover to a grounding surface of the portable terminal.

In accordance with another aspect of the present invention, a portable terminal includes a housing having an opening for receiving a battery pack, the housing having a grounding surface and a grounding protrusion, and a metallic battery cover for closing the opening in the housing, the cover having a cover protrusion. The grounding protrusion of the housing contacts the cover protrusion to form an electrically conductive path between the grounding surface and the metallic cover when the cover is closed.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
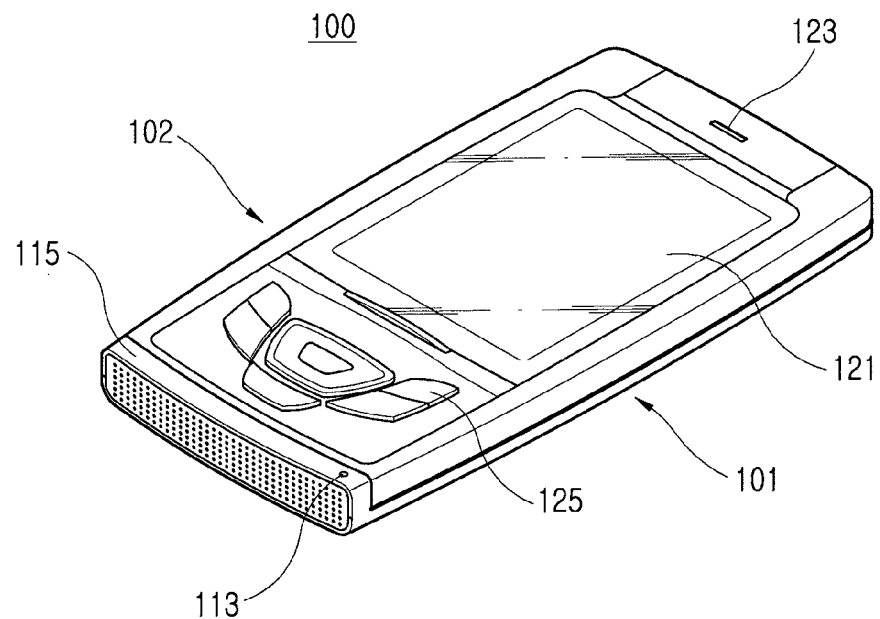
FIG. 1 is a perspective view of a portable terminal having a battery cover grounding device according to an exemplary embodiment of the present invention.
Figure 2:
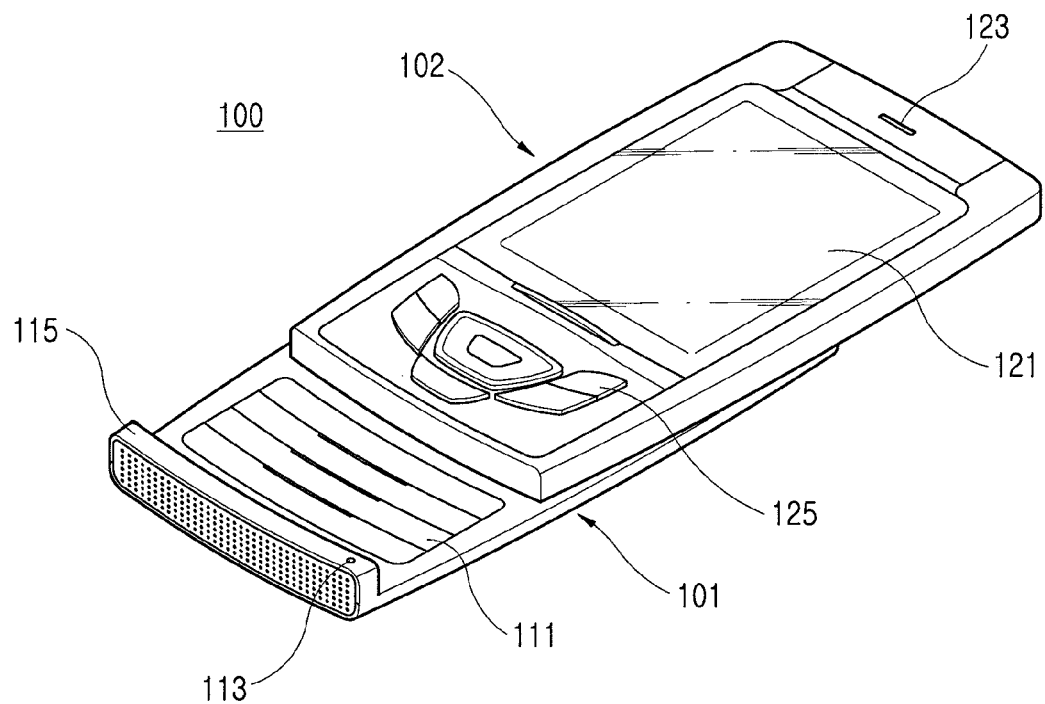
FIG. 2 is a perspective view of the portable terminal illustrated in FIG. 1 in an opened state.

Referring to FIGS. 1 and 2, a portable terminal 100 having a battery cover 201 (FIG. 3) grounding device according to an exemplary embodiment of the invention includes a first housing 101 and a second housing 102 slidably coupled to the first housing 101. In the illustrated embodiment, the battery cover 201 is installed on the back face of the first housing 101.

In the following description, the battery cover 201 grounding device is described in conjunction with a sliding-type portable terminal 100. It should be noted that the battery cover grounding device is not limited to sliding-type portable terminals and can be applied to any portable terminal that receives a battery pack and includes a separate cover for opening and closing the battery pack.

The first housing 101 has a keypad 111 and a transmitter 113 disposed on one side of the housing. The keypad 111 is opened and closed by the sliding movement of the second housing 102. The transmitter 113 is installed on a protrusion 115 protruding from one surface of the first housing 101. The second housing 102 is slidably coupled to the first housing 101 while being opposed thereto, thereby opening and closing the keypad 111. The second housing 102 is provided at one surface thereof with a display 121, a receiver 123, and a function keypad 125.

Since the display 121, the receiver 123, and the function keypad 125 are always exposed irrespective of whether or not the second housing 102 has been slid, they can provide functions such as watching moving picture files, watching broadcasting, and the like, even when the first housing is closed. When the keypad 111 of the first housing 101 is open, a user can use communication functions, such as calling a recipient or writing short messages/mail messages and the like, play games and perform other functions.

Figure 3:
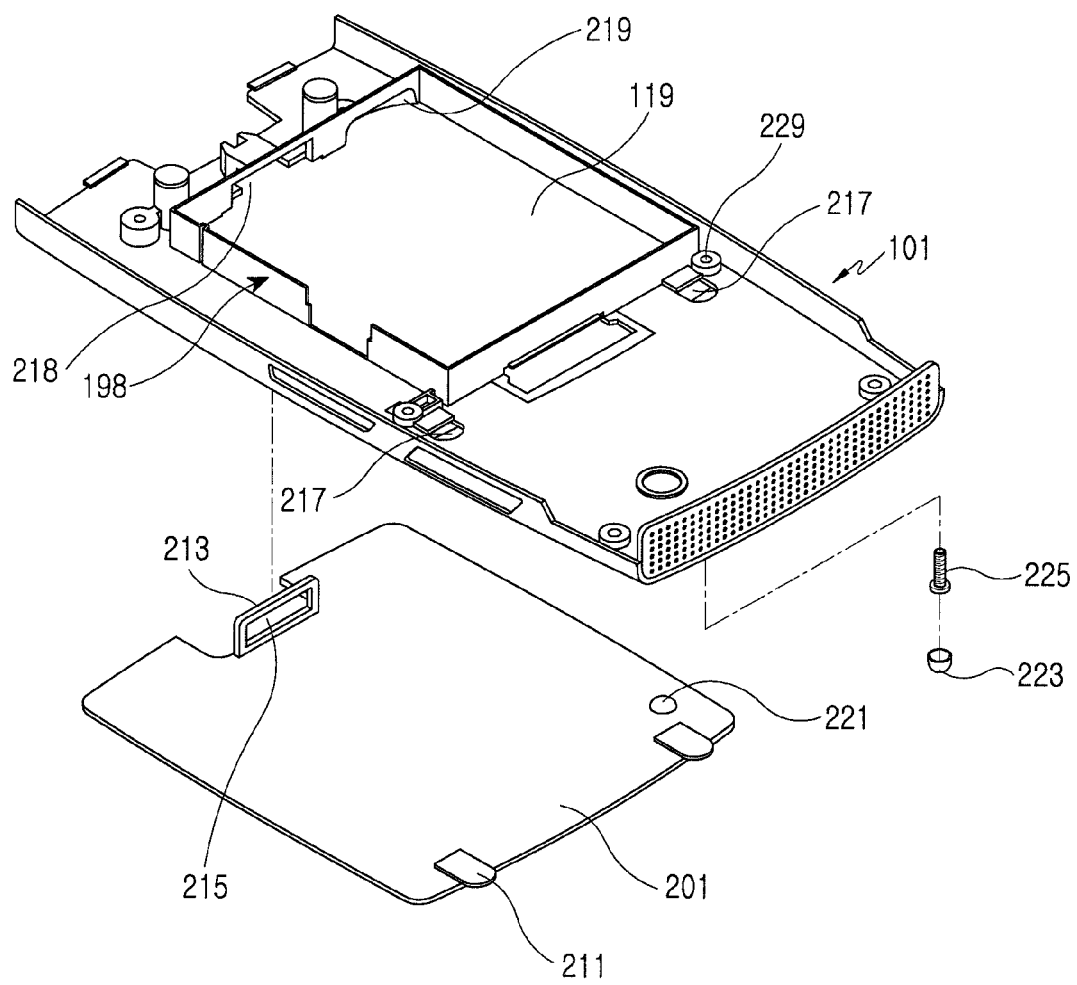
FIG. 3 is an exploded perspective view of the battery cover grounding device illustrated in FIG. 1.
Figure 4:
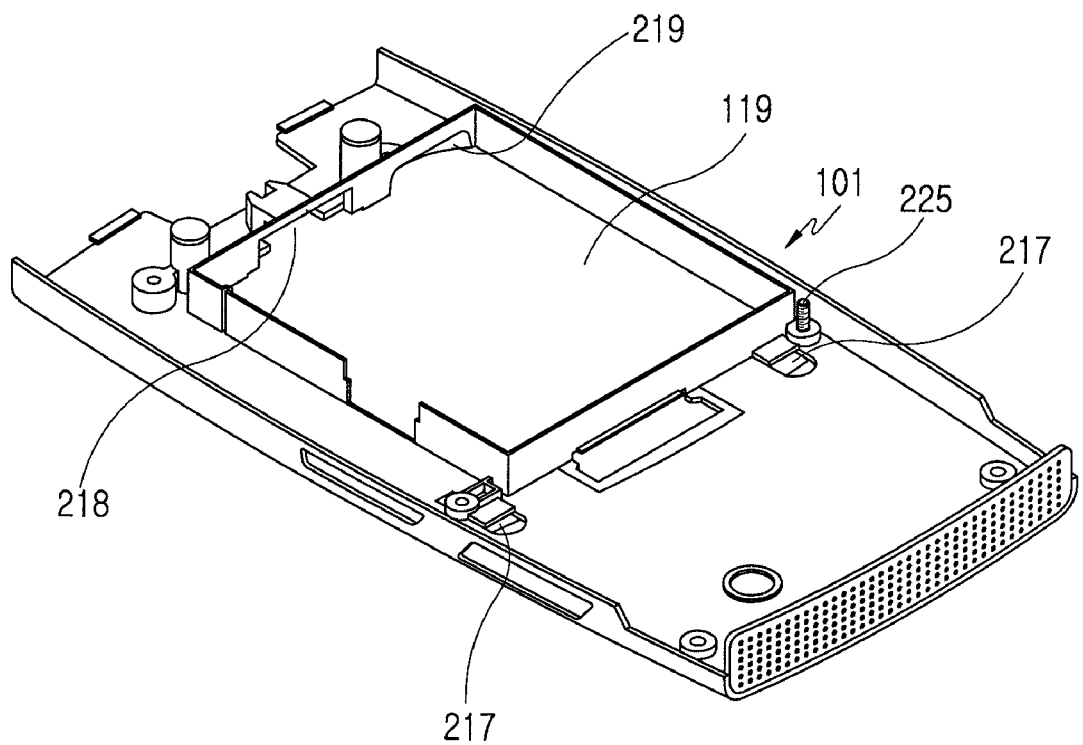
FIG. 4 is an assembled perspective view of the battery cover grounding device illustrated in FIG. 3.
Figure 5:
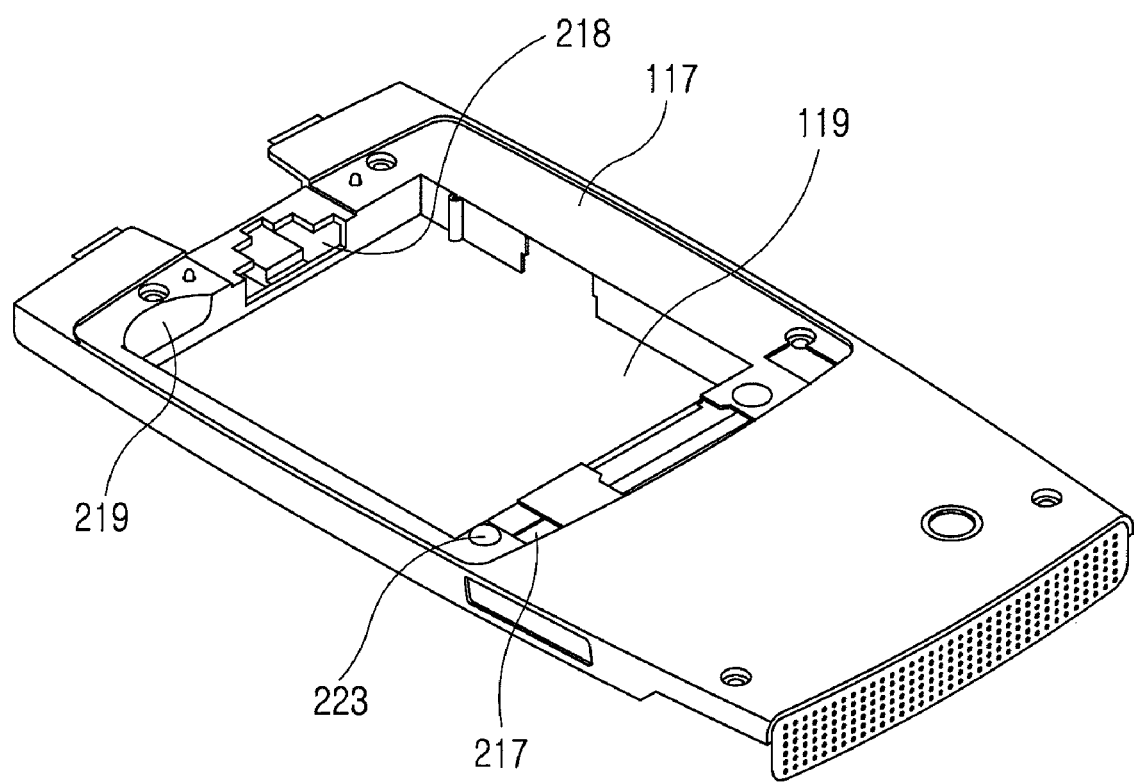
FIG. 5 is a perspective view of the battery cover grounding device illustrated in FIG. 4, as viewed from the exterior of the portable terminal.

Referring to FIGS. 3 to 5, the other surface of the first housing 101 has a battery opening 119 which is opened and closed by a separate battery cover 201. When the battery pack is installed into the battery opening 119, it is fixed thereto while being surrounded by a rib 198 extending inward from the first housing 101. When the battery pack (not shown) has been installed into the battery opening 119, the battery cover 201 is attached to the first housing 101 of the terminal 100 to close the battery opening 119 and protect the battery pack.

The battery cover 201 is made of a metallic material such as stainless steel. This is because the thickness of the battery cover 201 is limited in a slim terminal, and a metallic material provides adequate mechanical properties, such as impact resistance. An insulation material is applied to the battery cover 201, and a portion of the insulation material is removed to expose the metallic material therein. The insulating material on the metallic battery cover 201 prevents a user from receiving an electric shock even when current leaks through the battery cover 201. The battery cover 201 includes a cover protrusion 221 that protrudes through the portion where the insulation material is removed.

To fix the battery cover 201 to the first housing 101, the battery cover 201 includes a first engaging rib 211 at a first end thereof and a second engaging rib 213 at an opposite second end thereof. The first engaging rib 211 includes a pair of ribs that protrude outward from the first end and are substantially parallel to each other. The second engaging rib 213 protrudes upward from the second end of the battery cover 201 and has a through-hole 215.

To fix the battery cover 201 to the first housing 101, the first housing 101 includes an engaging hole 217 and a hook (not shown). The engaging hole 217 is formed at one side of the battery opening 119. The hook is installed on the other side of the battery opening 119 to move into and out of the battery opening. To install the hook, an operating recess 218 is formed at the other side of the battery opening 119, so that the hook is linearly moved while being installed in the operating recess 218, thereby moving into and out of the battery opening 119. The operating recess 218 may be provided with a coil spring (not shown) to provide elastic force on the hook to press against the battery opening 119. The construction of the hook and the coil spring will be easily understood by persons skilled in the art.

The battery cover 201 is brought into contact with the first housing 101 by pivoting about the first engaging rib 211 while the first rib is engaged with the engaging hole 217. When the battery cover 201 is brought into contact with the first housing 101, the second engaging rib 213 is moved into the battery opening 119. At this time, the through-hole 215 of the second engaging rib 213 faces the hook, and the hook protrudes into the battery opening 119 due to the elastic force of the coil spring, thereby being engaged with the second engaging rib 213, specifically, the through-hole 215. Then, the battery cover 201 is fixed to the first housing 101, closing the battery opening 119.

To prevent the battery cover 201 from protruding outward from the outer periphery of the first housing 101 when it is attached to the first housing 101, the first housing 101 is provided with a cover recess 117. The cover recess 117 is formed along an edge of the battery opening 119, and has a depth that corresponds to the thickness of the battery cover 201 from the outer periphery of the first housing 101. Thus, when the battery cover 201 is mounted onto the first housing 101, it is positioned inside the cover recess 117, and the outer surface thereof has the same level as that of the first housing 101.

Meanwhile, to facilitate replacing the battery pack received in the battery opening 119, a release hole 219 is formed at one end wall of the battery opening 119. The release hole 219 exposes a portion of one side of the battery pack mounted into the battery opening 119 to outside, and a user can release the battery pack from the battery opening 119 by contacting the exposed portion of the battery pack through the release hole 219 and drawing out the battery pack.

To prevent the metallic battery cover 201 from affecting the operations of an antenna or circuit devices of the terminal 100, the battery cover 201 is grounded to a grounding surface 189 (FIG. 6) formed in the terminal 100. To ground the battery cover 201 to the grounding surface 189, the terminal 100 includes a ground member that consists of a cover protrusion 221 and a grounding protrusion 223 attached to the first housing 101.

Figure 6:
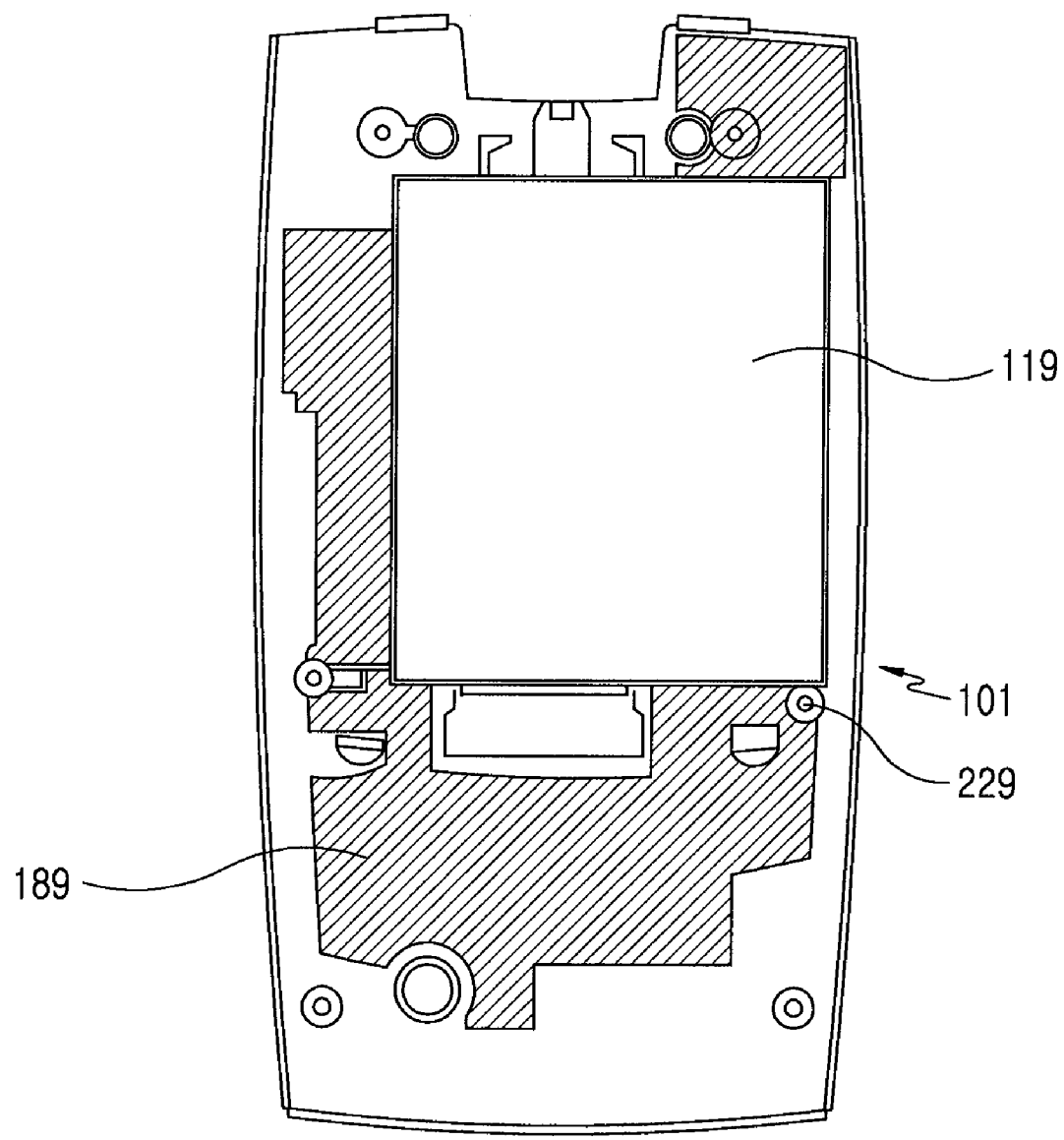
FIG. 6 is a plan view illustrating the portable terminal illustrated in FIG. 3.

Referring to FIG. 6, the grounding surface 189 is formed by applying at least a portion of the inner surface of the first housing 101 with an electromagnetic interference (EMI) paint, thereby providing a ground to the terminal 100. Further, in addition to preventing electromagnetic waves generated from the operations of the internal circuit devices of the terminal 100 from radiating outside, the grounding surface 189 prevents static electricity generated from outside from interfering with the internal circuit devices.

To connect the battery cover 201 to the grounding surface 189, the terminal 100 is provided with the grounding protrusion 223. Referring again to FIG. 3, the grounding protrusion 223 is shaped like a cap that is coupled to a head portion of the screw 225, and is connected to the grounding surface 189 through the screw 225.

When the screw 225 is coupled to the first housing 101 of the terminal 100, the head portion thereof is positioned inside a screw hole 229 of the first housing 101, and a portion of the grounding protrusion 223 is positioned in the screw hole 229.

When the battery cover 201 is coupled to the first housing 101, the grounding protrusion 223 comes into contact with the cover protrusion 221. The grounding protrusion 223 may be made of a resilient material, so that upon contact with the cover protrusion 221, it is deformed corresponding to the shape of the cover protrusion 221. Thus, even when the cover protrusion 221 and the grounding protrusion 223 are brought into contact with each other, the battery cover is neither applied with external force nor deformed, so that the battery cover 201 is stably kept engaged with the terminal 100.

In the present exemplary embodiment, the screw 225 is fastened to the first housing 101 so as to be connected to the grounding surface 189 of the inner surface of the housing, and to connect the cover protrusion 221 to the grounding surface 189. Alternatively, the terminal 100 may be provided with other types of grounding surfaces or grounds. For example, the first housing 101 may house a main board (not shown) of the terminal 100, and the main board may be fixed to the first housing 101 by the screw 225. Typically, a printed circuit board has a ground pattern, and persons skilled in the art will appreciate that the main board of a portable terminal has a ground pattern. By fastening the screw 225 to the ground pattern of the main board, the grounding protrusion 223 can be connected to the ground pattern of the printed circuit board installed inside the terminal 100.

Moreover, if the grounding surface is also formed on the cover recess 117, the grounding protrusion 223 can be attached to the cover recess 117. That is, if the battery cover 201 can be connected to the grounding surface provided to the terminal 100, the grounding protrusion 223 can be directly attached and connected to the grounding surface provided to the cover recess 117 without passing through the screw 225. In the present exemplary embodiment, the grounding surface 189 is formed on an inner surface of the terminal 100, so that the grounding protrusion 223 comes to be connected to the grounding surface 189 through the screw 225.

As a result, the battery cover 201 is grounded to the grounding surface 189 provided to the terminal 100, or the ground pattern formed on the printed circuit board, through the cover protrusion 221 and the grounding protrusion 223. Alternatively, the grounding protrusion 223 may be connected to the grounding surface 189 and the like through the screw 225.

As set forth above, according to the battery cover grounding device for a portable terminal of the exemplary embodiment of the present invention, the metallic battery cover is connected to the grounding surface provided to the terminal while closing the battery opening to thereby prevent current leakage and to produce stable operation of the terminal. That is, by preventing the metallic battery cover from having an electrical property using high frequency generated from the circuit devices of the terminal, or transmission signal of the antenna unit, stable operation of the terminal is realized, and performance of the antenna unit and the like is secured. Further, the metallic cover diminishes malfunctions of the terminal by grounding external static electricity.

It will be understood by those skilled in the art that the embodiment illustrated and described above is merely exemplary, and that various changes in form and details may be made therein without departing from the spirit and scope of the invention. For example, in the illustrated embodiment, the grounding protrusion 223 is connected to the ground surface 189 through the screw 225. However, if the grounding protrusion 223 is made of a flexible conductive tape, it can be exposed outside the first housing 101 through the screw hole 229, to which the screw is not fastened, when attached to the inner surface of the first housing 101 that has the grounding surface 189 thereon. Since the cover protrusion 221 of the battery cover 201 protrudes from the battery cover 201, it can contact the grounding protrusion of conductive tape, which is attached to the inner surface of the first housing 101, through the screw hole 229.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A battery cover grounding device for a portable terminal, comprising:
   a metallic battery cover; and
   a grounding member disposed on the terminal to be connected to a grounding surface of the terminal and to be in contact with the battery cover, the grounding member comprising a cover protrusion on the battery cover and a grounding protrusion on the terminal to contact the cover protrusion.

2. The device as claimed in claim 1, wherein an insulation material is applied to at least a portion of the battery cover.

3. The device as claimed in claim 2, wherein a portion of the insulation material on the cover protrusion is removed.

4. The device as claimed in claim 1, wherein the grounding surface of the terminal comprises electromagnetic interference (EMI) paint disposed on an inner surface of the housing of the terminal.

5. The device as claimed in claim 1, further comprising a fastener hole formed on the terminal and a fastener extending through the fastener hole, and wherein the grounding protrusion comprises a cap coupled to the fastener and the grounding protrusion is connected to the grounding surface of the terminal by the fastener.

6. The device as claimed in claim 5, wherein the grounding surface of the terminal is a ground pattern configured on a printed circuit board of the terminal, and the fastener is fastened to a fastening hole formed on the ground pattern.

7. The device as claimed in claim 1, wherein the grounding protrusion comprises a flexible conductive tape.

8. A portable terminal, comprising:
a housing having a battery opening;
a metallic battery cover for closing the battery opening; and
a grounding member for grounding the metallic battery cover to a grounding surface of the portable terminal,
wherein when the battery pack has been installed into the battery opening, the metallic battery cover is attached to the housing to close the battery opening and protect the battery pack.

9. The portable terminal as claimed in claim 8, wherein the grounding member comprises a cover protrusion on the battery cover and a grounding protrusion on the terminal, the grounding protrusion contacting the cover protrusion when the cover is closed.

10. The portable terminal as claimed in claim 9, further comprising a fastener hole formed on the terminal and a fastener extending through the fastener hole, the fastener connecting the grounding protrusion to the grounding surface of the terminal.

11. The portable terminal as claimed in claim 10, wherein the grounding protrusion comprises a cap coupled to the fastener.

12. The portable terminal as claimed in claim 10, wherein the grounding surface comprises a ground pattern on a printed circuit board disposed in the housing, and the fastening hole is formed on the ground pattern of the printed circuit board.

13. The portable terminal as claimed in claim 9, wherein the grounding protrusion comprises a flexible conductive tape.

14. The portable terminal as claimed in claim 8, wherein the grounding surface of the portable terminal comprises electromagnetic interference (EMI) paint disposed on an inner surface of the housing of the terminal.

15. The portable terminal as claimed in claim 8, wherein the grounding surface comprises a ground pattern on a printed circuit board disposed in the housing.

16. The portable terminal as claimed in claim 8, wherein the battery cover comprises a stainless steel material.

17. A portable terminal, comprising:
a housing having an opening for receiving a battery pack, the housing having a grounding surface and a grounding protrusion; and
a metallic battery cover for closing the opening in the housing, the cover having a cover protrusion,
wherein the grounding protrusion of the housing contacts the cover protrusion to form an electrically conductive path between the grounding surface and the metallic cover when the cover is closed.

18. The portable terminal as claimed in claim 17, wherein the grounding protrusion comprises a cap coupled to a fastener extending through a fastener hole on the housing.

19. The portable terminal as claimed in claim 17, wherein the housing comprises a recess for receiving the battery cover.

20. The portable terminal as claimed in claim 19, wherein at least part of the grounding surface is formed on the recess for receiving the battery cover.

* * * * *